March 12, 1968 A. T. LING 3,373,407

SCRATCH PAD COMPUTER SYSTEM

Filed Aug. 2, 1965 3 Sheets-Sheet 1

INVENTOR.
ANDREW T. LING
BY
Carl V. Olson
Attorney

March 12, 1968 A. T. LING 3,373,407

SCRATCH PAD COMPUTER SYSTEM

Filed Aug. 2, 1965 3 Sheets-Sheet 2

INVENTOR.
ANDREW T. LING

BY Carl V. Olson

Attorney

March 12, 1968 A. T. LING 3,373,407

SCRATCH PAD COMPUTER SYSTEM

Filed Aug. 2, 1965 3 Sheets-Sheet 3

INVENTOR.
ANDREW T. LING
BY
Carl V. Olson
Attorney

United States Patent Office 3,373,407

Patented Mar. 12, 1968

3,373,407

SCRATCH PAD COMPUTER SYSTEM

Andrew T. Ling, Collingswood, N.J., assignor to Radio Corporation of America, a corporation of Delaware Filed Aug. 2, 1965, Ser. No. 476,423
14 Claims. (Cl. 340—172.5)

ABSTRACT OF THE DISCLOSURE

A computer system in which a processor matrix is provided for performing addition, subtraction, comparisons, shifts, etc., on one or two operand inputs. An operand can be supplied from an input data bus through a "utility" register to the processor matrix. An operand can also be supplied from a data register of a scratch pad storage means to the processor matrix. The output of the processor matrix can be directed to a storage location in the scratch pad storage means. There is thus a direct, local data-path loop from the scratch pad storage means through the data register, through the processor matrix from its input to its output, and back to the scratch pad storage means. This local data-path loop is provided in addition to other intercommunication data paths including the data buses, to minimize the time required for data transfers and to most fully utilize the processor matrix.

This invention relates to computer systems, and particularly to provisions for data flow to and from the arithmetic unit in the central processor of a computer.

An arithmetic unit includes a processor matrix capable of performing addition, subtraction, shifting, comparing, masking, etc., on one or two operand inputs. A "processor matrix" as used herein is a network not including storage means for its operand inputs and its output. The two operand inputs are customarily supplied to the processor matrix from two respective registers, which receive the operands from the main memory via a data bus. The output of the processor matrix is supplied to a register from which it is transferred to the main memory via a data bus.

Many operations performed by the processor matrix are very simple and iterative, but are unduly time consuming because each step involves one or more main memory cycles. Each main memory cycle may, for example, require from one to several microseconds, which is a long time compared with the time required for logic circuit operation. For this reason, it is known to employ an auxiliary scratch pad memory of relatively small capacity and relatively high speed. Each memory cycle of a scratch pad memory may require only a small fraction of one microsecond. A scratch pad memory can be used, as the name implies, to temporarily store operands and intermediate results obtained during the course of an arithmetic computation and other processing operations. The scratch pad memory can also be used to store housekeeping information concerning the instruction and program being executed. The use of a scratch pad memory, with its relatively short read-write cycle time, has improved computer operating characteristics. However, the full potential for improvement in operation by using a scratch pad memory has not heretofore been achieved because the scratch pad memory has been employed simply as an auxiliary memory coupled to the data bus in the same way as the main memory.

It is a general object of this invention to provide a computer system having an improved facility and flexibility in the transfer of data between a scratch pad storage means, a processor matrix, a data bus and other units coupled to the data bus.

It is another object to provide an improved computer system having a direct data path loop from a scratch pad storage means through a processor matrix and back to the scratch pad storage means.

It is a further object to provide an improved computei system in which the data register of a scratch pad memory is coupled to an operand input of a processor matrix, to a data bus, and to the data input of the scratch pad memory.

In accordance with an example of the invention, a "utility" register is connected for use as one of the operand input registers of a processor matrix. The utility register receives data from an input data bus. The data register of a scratch pad memory is connected for use as the other one of the operand input registers of the processor matrix. The data register receives data from any addressed location in the scratch pad memory, or from the input data bus. The data register is also connected to supply its contents through a regeneration path to the data input of the scratch pad memory, and to an output data bus. The output of the processor matrix can be directed to the data input of the scratch pad memory, or it can be directed through an "intermediate" register to the output data bus. Data may be coupled from the output bus to the input bus, and via the buses, to and from a main memory and input-output devices. The several data paths permit the usual communication between the scratch pad memory and the data buses, and, in addition, provide for local, high-speed intercommunication between the scratch pad memory and the processor matrix. In accordance with another example of the invention, the system includes a scratch pad storage means, which, instead of being a scratch pad memory, is a scratch pad array of registers any one of which can be accessed for supplying and receiving data.

Figure 1:
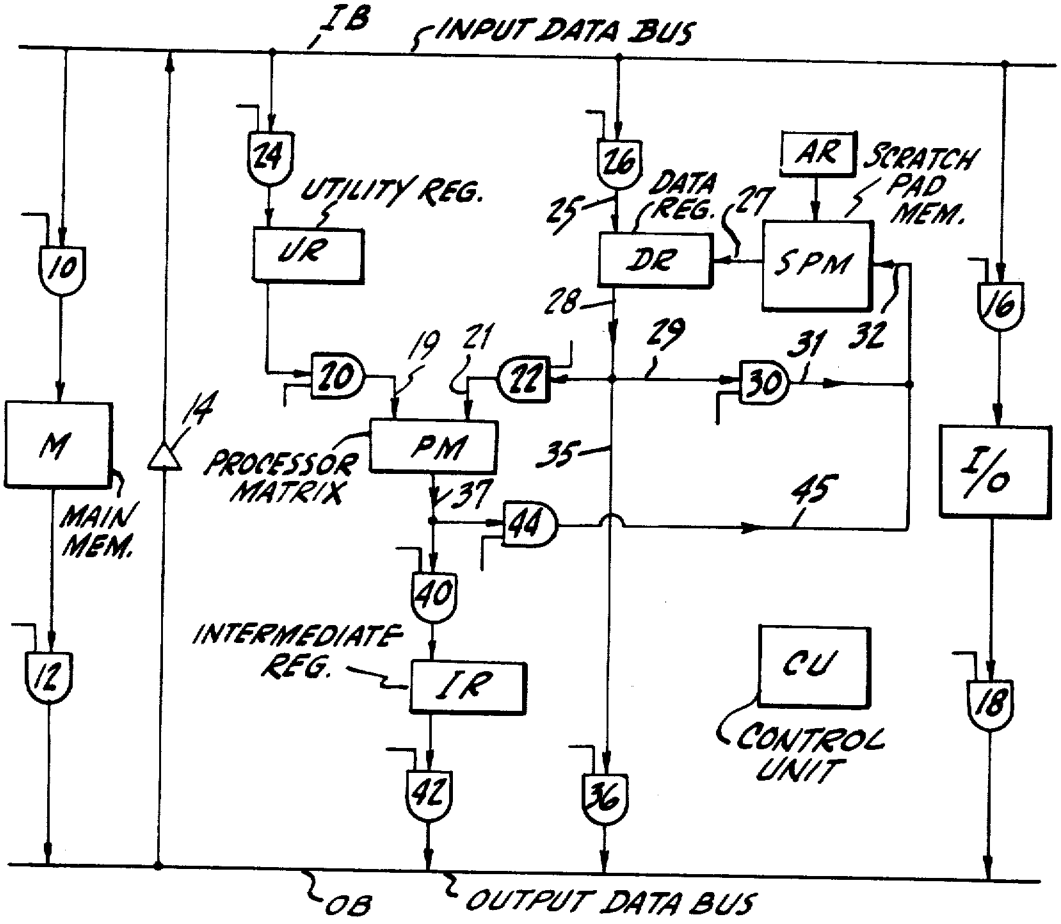
FIG. 1 is a diagram showing the data structure of a computer system constructed according to the teachings of the invention and including a scratch pad memory.

Referring now in greater detail to FIG. 1 which shows the data path structure of a computer system, the system includes an input data bus IB and an output data bus OB. Each of the data buses contains a number of conductors for conveying a corresponding number of binary bits of data characters, words or larger units. All the other lines in the drawing are also multi-conductor lines. A main memory M is connected to receive data from the input data bus IB through a gate 10 and to supply data through a gate 12 to the output data bus OB. The main memory M may be any conventional random-access memory having an address register (not shown) for determining the memory location from which data is read, or into which data is written. A bus amplifier 14 is provided for transferring data from the output data bus OB to the input data bus IB.

The gates 10 and 12 and other gates to be described, are conventional "and" gates. Other types of gates may of course, be employed provided that appropriate attention is given to the polarities of the signals involved and the basic functions performed by the gates. Each gate symbol shown in the drawing represents a number of elemental gates, one connected between each conductor of the input line and one conductor of the output line. The gate symbol includes an enabling input conductor by means of which an enabling signal is supplied to all of the many elemental gates to allow the passage through the gate of multi-bit data signals.

Input and output devices I/O are connected to receive data from input data bus IB through a gate 16, and are connected to supply data to output data bus OB through a gate 18.

The remainder of the drawing to be described shows the central processor portion of the computer system including a logic-arithmetic unit at the heart of which is a processor matrix PM. The processor matrix is a network for performing addition, subtraction, shifting, comparing, masking, etc., on one or two operand inputs. The term "processor matrix" as used herein is a network, not including all necessary input and output storage means, which generally provides an output only during receipt of an input or inputs.

The processor matrix PM has an input 19 for a first operand through a gate 20, and has an input 21 for a second operand through a gate 22. A "utility" register UR is provided for receiving a first operand from the input data bus IB via a gate 24. A first operand in the utility register UR is coupled through the gate 20 to the first operand input 19 of the processor matrix PM.

A data register DR of a scratch pad memory SPM is provided for receiving a second operand and supplying it through the gate 22 to the second operand input 21 of the processor matrix PM. The scratch pad memory SPM is an array or stack of memory elements, such as magnetic cores, together with windings and circuits for writing information into the memory elements and reading out information from the memory elements to the data register DR. The data register DR is connected to receive data from the input data bus IB through a gate 26 and over a line 25. The data register DR is also connected to receive data over a line 27 from any selected data storage location in the scratch pad memory SPM. Any desired data storage location in the scratch pad memory SPM may be addressed for accessing by the contents of an address register AR.

The reading out of data from the conventional scratch pad memory SPM to the data register DR results in the destruction of the read-out information in the scratch pad memory SPM. The read-out information may be restored or regenerated in the addressed storage location of the scratch pad memory by a transfer of the data from the data register DR over a line 28, a line 29, a gate 30 and a line 31 to a data input 32 of the scratch pad memory SPM. The information returned from the data register DR to the addressed storage location in the scratch pad memory SPM may be, as described, (1) the information previously read out from the memory SPM or may be (2) information substituted into the data register DR through gate 26 from input data bus IB, or (3) a combination of some previously read-out information and some substituted information.

The scratch pad memory system, including the scratch pad memory SPM, the address register AR, the data register DR and the data restoring loop including gate 30, may be any conventional, known scratch pad memory system. Known scratch pad memory systems have a read-write cycle time of less than one-half of a microsecond. This speed of operation is appreciably less than that obtained by known large-capacity main memories suitable for use as the main memory M in the system being described.

The data register DR is connected also over a line 35 and through a gate 36 to the output data bus OB.

The processor matrix PM has an output 37 conveying the result of its operation on one or both of the operand inputs supplied thereto. The output 37 from processor matrix PM is connected through a gate 40 to an "intermediate" register IR. The output of intermediate register IR is connected through a gate 42 to the output data bus OB. The output 37 of processor matrix PM is also connected through a gate 44 and a line 45 to the data input 32 of the scratch pad memory SPM.

The many data-path gates and data-path units shown in the drawing are all under the control of a control system represented in the drawing by a control unit CU. The control unit is connected to receive instructions and other control stimuli directly from units shown, and via buses IB and OB, over paths not shown. The construction of the control unit may be entirely conventional and may be readily accomplished by one skilled in the art who has an understanding of the flow of data, to be described, through the data paths in the system.

In the operation of the computer system of FIG. 1, the processor matrix PM performs various logical and arithmetic operations on data supplied to its two operand inputs by the utility register UR and the data register DR. The first operand supplied by utility register UR through gate 20 to the first operand input 19 of processor matrix PM may come from any one of several units via the input data bus. For example, the data may come from the main memory M through gate 12, output data bus OB, amplifier 14, input data bus IB and gate 24. Or, the first operand may come from a previously-generated output of the processor matrix PM, when located in the intermediate register IR, through a path including gate 42, output data bus OB, amplifier 14, input data bus IB and gate 24. Alternatively, the first operand may come from the data register DR through line 28, line 35, gate 36, output data bus OB, amplifier 14, input data bus IB and gate 24. Yet another path for the first operand may be from an input-output device I/O through gate 18, output data bus OB, amplifier 14, input data bus IB and gate 24.

The second operand supplied by data register DR through gate 22 to the second operand input 21 of the processor matrix PM may also come from main memory M, intermediate register IR or an input-output device I/O through paths including gate 26 instead of gate 24. Or, the second operand may be read to the data register DR over line 27 from the scratch pad memory SPM, and then, if desired, restored in the scratch pad memory SPM via the regeneration loop path 29, 30, 31 and 32.

One, or the other, or both, of the first and second operands supplied from the utility register UR and/or the data register DR are acted upon by the processor matrix PM to provide a result, examples of which are later described, at its output 37. The output of processor matrix PM may be passed through a gate 40 to the intermediate register IR from which it may be passed through a gate 42, output data bus OB, amplifier 14 and input data bus IB to main memory M, or to utility register UR, or to data register DR or to an input-output device I/O.

In addition, the output 37 of processor matrix PM may be supplied directly through a gate 44 and a line 45 to the data input 32 of scratch pad memory SPM, from which it may be read out through line 27 to the data register DR. Further, the gates 44 and 30 may be controlled so that part of the information supplied to scratch pad memory SPM comes from the processor matrix PM and the remainder of the information supplied comes from the data register DR.

According to a more specific example of the operation of the system, it may be desired to repeatedly add a number located in the utility register UR to a number located in the data register DR. The first sum generated at the output 37 of the processor matrix PM is passed through gate 44, line 45 to scratch pad memory SPM from which it is read to data register DR. Then, the number still located in utility register UR is added to the sum located in the data register DR and the new sum at the output of the processor matrix is passed through the scratch pad memory SPM to the data register. The additions may be repeated any desired number of times making use of the additional, local, intercommunication loop between the data register DR and the processor matrix PM. Transfers of the same or other data may simultaneously be made through paths including the output data bus OB and the input data bus IB.

According to another specific example of operation of the system, it may be desired to perform a comparison or other logical operation on a sequence of operands located in the main memory M in relation to a corresponding sequence of operands located in the scratch pad memory SPM. An operand from the main memory M is transferred via gate 12, output bus OB, bus amplifier 14, input bus IB and gate 24 to utility register UR. Simultaneously, a corresponding operand from the scratch pad memory SPM is transferred via read-out path 27 to the data register DR. The two operands, one in utility register UR and the other in data register DR, are applied to the processing matrix PM to provide an output at 37. The output from the processor matrix PM can be returned to the location in the main memory from which the operand was taken. Alternatively, the output from the processor matrix PM can be returned to the location in the scratch pad memory from which the other operand was taken. The operation is repeated until all operands in the sequence of operands in the main memory M are compared with corresponding operands in the sequence of operands in the scratch pad memory SPM.

In a variation of the described operation, the results of the comparisons (or other functions) performed in the processor matrix PM on the sequence of operands may be applied to a recognition circuit (not shown) to determine a cumulative result. The cumulative result may be used, through the control unit CU, to control the operation of the computer in accordance with functional requirements.

Figure 2:
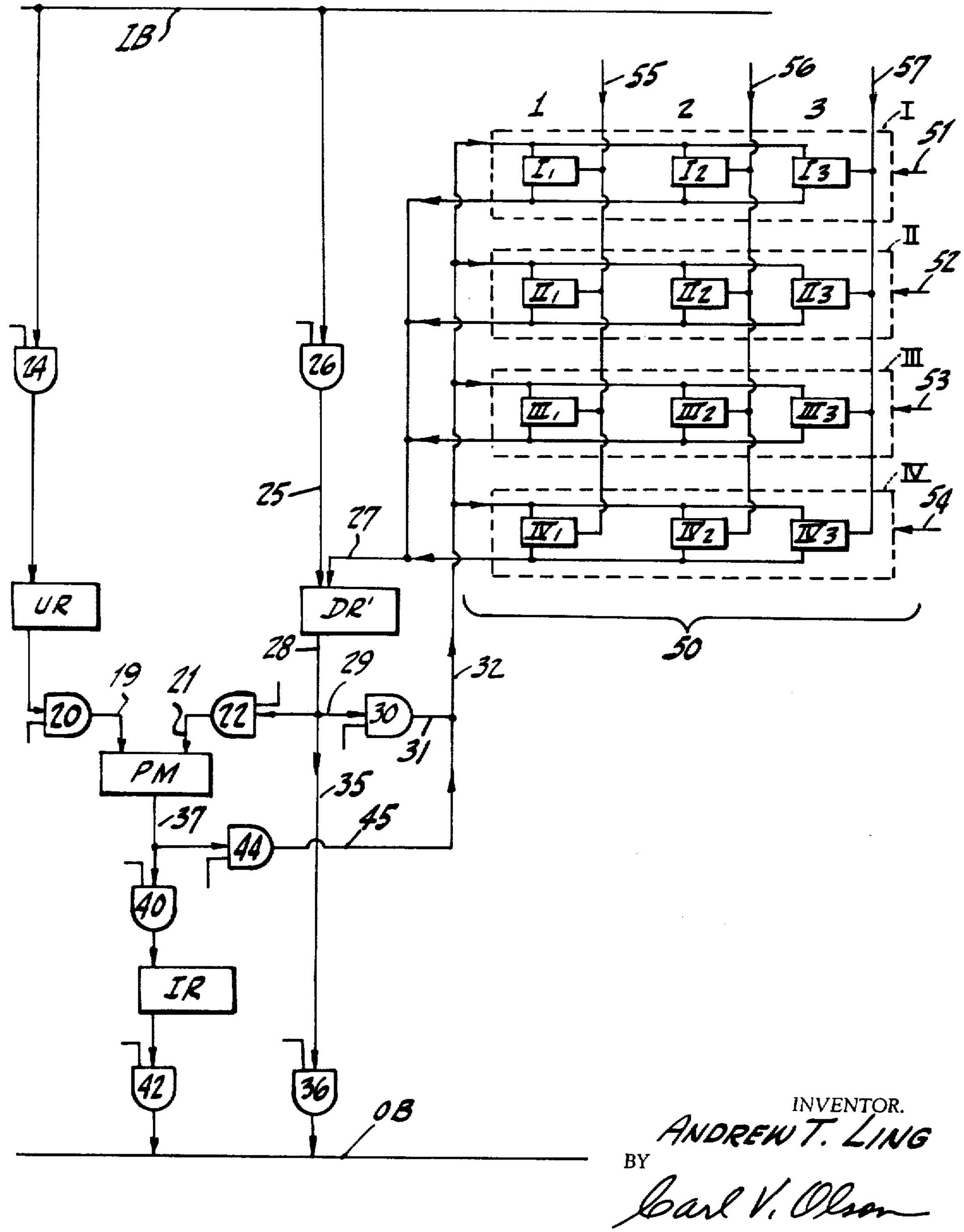
FIG. 2 is a diagram of a portion of a computer system like the one of FIG. 1 but differing therefrom to illustrate the use of a scratch pad array of registers instead of a scratch pad memory.

Reference is now made to FIG. 2 for a description of a computer system similar to that shown in FIG. 1 but differing in that an array of scratch pad registers is used in place of a scratch pad memory. FIG. 2 shows the central processor portion of a computer system like that shown in FIG. 1. The units in FIG. 2 which are the same as corresponding units in FIG. 1 are given the same reference numerals. In FIG. 2, an array of scratch pad registers 50 and a data register DR′ are included in place of the scratch pad memory system SPM, AR and UR in FIG. 1.

The scratch pad array of registers 50 includes registers arranged in rows I, II, III and IV and columns 1, 2 and 3. Each register may consist of several or more flip-flop circuits for storing a corresponding several or more binary bits of a unit of data. Outputs of all of the registers in the array are connected over line 27 to data register DR′.

Any one of the registers in the array 50 may be selected to receive data from the data register DR′ or the processor matrix PM, or to supply data to the data register DR′. Selection of a particular register is accomplished by energizing one of the row selection conductors 51, 52, 53 or 54 and by energizing one of column selection conductors 55, 56 or 57. For example, if the third row is selected by energization of row selection conductor 53, and if the second column is selected by energization of the column selection conductor 56, then the register III 2 is enabled to receive data from input line 25 and supply data to output line 28. Each register has input and output gates (not shown) which are enabled when selected by both a row selection conductor and a column selection conductor.

The different sets or rows I, II and III, for example, of registers in FIG. 2 may be used to contain information concerning a corresponding number of program or processor states. Each set of registers may contain instruction registers, program counter registers, data accumulation registers, etc., for a corresponding program. One set of registers may be for the user's production program, the second set may be for a program controlling or servicing input-output devices and servicing interrupt conditions, and the third set may be for a program analyzing interrupt conditions and performing executive routes. The scratch memory SPM in FIG. 1 may contain storage locations similarly arranged in sets for the same purpose.

The operation of the system of FIG. 2 including an array of scratch pad registers 50 is the same as the described operation of the system of FIG. 1 having a scratch pad memory SPM. Also, the systems according to both FIGS. 1 and 2 can be operated to quickly switch from one program using one set of registers (or storage locations) to another program using another set of registers without the necessity for an intervening transfer to the main memory of all information needed later for continuing the interrupted program and a retrieval from memory of all information needed at once for execution of the interrupting program. The execution of the interrupting program can be entered into very quickly because the contents of registers containing information needed by the interrupting program are locally available to the processor matrix PM. Transfers of other data may be simultaneously effected via the input and output data buses IB and OB.

Figure 3:
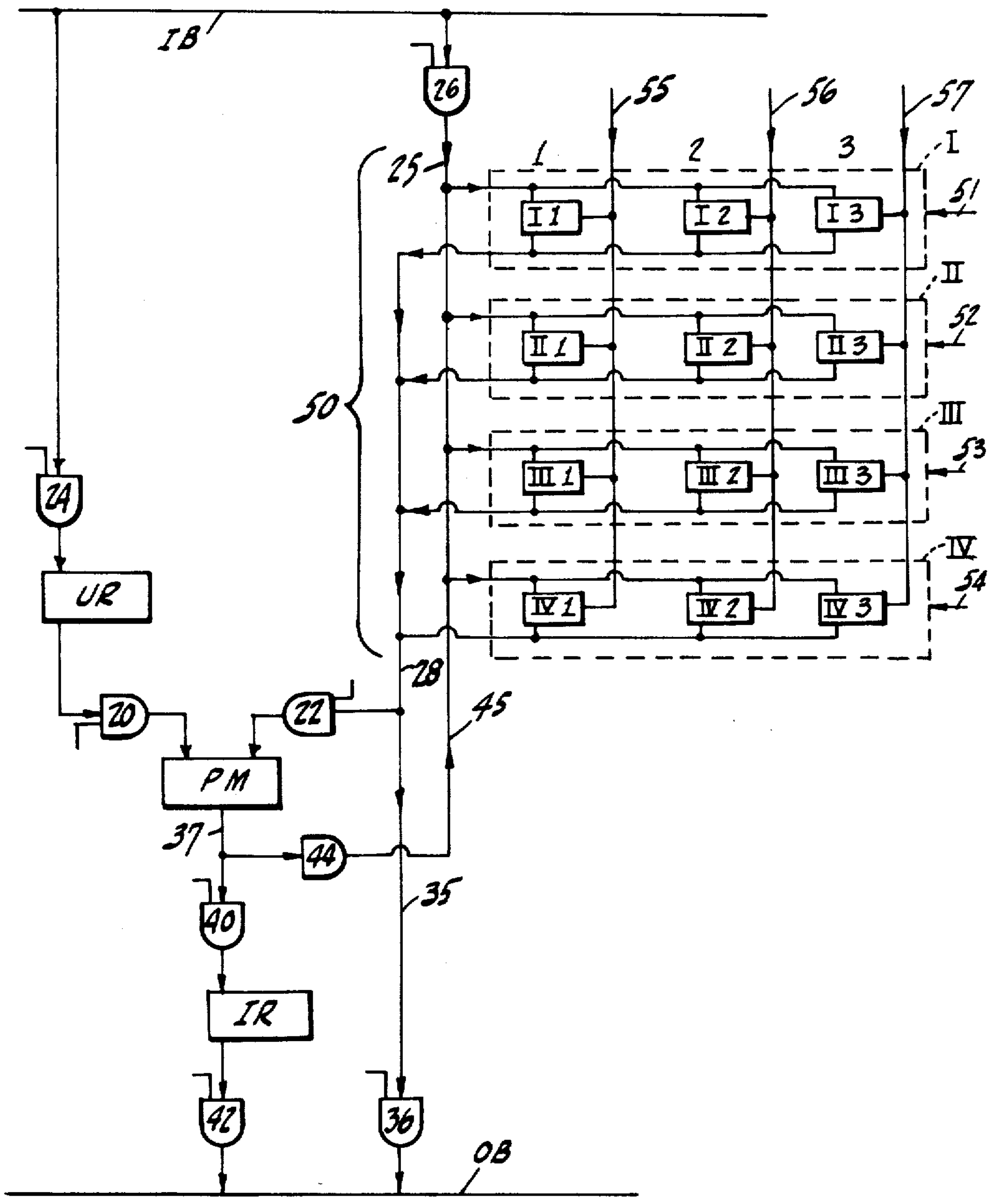
FIG. 3 is a diagram of an arrangement like that shown in FIG. 2 but differing therefrom in not including a data register.

FIG. 3 shows a system which differs from the system of FIG. 2 in that the data register DR′ is omitted and the outputs of the registers in the array 50 are coupled directly through gate 22 to the second operand input of the processor matrix PM. Also, the inputs of the registers in the array 50 are coupled to receive data from input data bus IB through gate 26 and from processor matrix PM through gate 44. A register in the array 50 may receive part of a word from input data bus IB simultaneously with receipt of another part of the word from processor matrix PM.

The operation of the system of FIG. 3 is similar to the operation of the systems of FIGS. 1 and 2, with the difference that a result from the processor matrix PM cannot be immediately returned to the same location in the scratch pad storage array 50 from which a second operand is being supplied. This is because there is no intermediate storage such as is provided by data register DR or DR′ in FIGS. 1 and 2. However, in FIG. 3, the result from the processor matrix PM may be immediately returned to a location in the array 50 which is different from the location simultaneously supplying the second operand.

Each gate in FIGS. 1, 2 and 3, and each data path, represents gates and conductors for the several or more information bits of a computer word. Wherever a data path divides and follows two or three branch paths, the gates in the branch paths can be controlled to pass all of a computer word along one branch, or to pass parts of the computer word along respective different paths. Similarly, where two data paths converge, the gate in one of the data paths can be controlled to pass all of a computer word, or the gates may be controlled to each pass respective parts of a computer word.

The examples of the invention illustrated in FIGS. 1, 2 and 3 are characterized in having data paths between units via data buses IB and OB and, in addition, in having intimate, local intercommunication paths between a scratch pad storage means SPM or 50 and the processor matrix PM. The additional intercommunication paths provided permits simple iterative operations to be performed more rapidly, and permit them to be performed at the same time as other transfers of data are made via the input data bus IB and the output data bus OB. The many data paths included in the systems of FIGS. 1 and 2 can be gated to more quickly and effectively accomplish the enormously involved, time-dependent sequences of elemental data transfer steps required in the execution of computer programs. The illustrated organization of data paths also permits a simplification of the work of programmers in writing programs for execution by the computer.

What is claimed is:

1. A computer system, comprising:

a data bus, a processor matrix having first and second inputs for first and second operands and having an output, a utility register connected to receive data from said data bus and to supply data to said first input of said processor matrix, a scratch pad storage means having a plurality of storage locations and having an address input for selecting any desired storage location in the storage means, means to transfer data from said data bus to any selected one of said scratch pad storage locations, means to transfer data from any selected one of said scratch pad storage locations directly to said second input of said processor matrix and to said data bus, an intermediate register having an output coupled to said data bus, and means to couple the output of said processor matrix to the input of said intermediate register and directly to any selected storage location in said scratch pad storage means.

2. A computer system, comprising:

an input data bus, and an output data bus coupled thereto, a main memory coupled to said data buses, a processor matrix having first and second inputs for first and second operands and having an output, a utility register connected to receive data from said input data bus and to supply data to said first input of said processor matrix, a scratch pad storage means having a plurality of storage locations and having an address input for selecting any desired storage location in the storage means, means to transfer data from said input data bus to any selected one of said scratch pad storage locations, means to transfer data from any selected one of said scratch pad storage locations directly to said second input of said processor matrix and to said output data bus, an intermediate register having an output coupled to said output data bus, and means to couple the output of said processor matrix to the input of said intermediate register and directly to any selected storage location in said scratch pad storage means.

3. A computer system, comprising:

a data bus, a processor matrix having first and second inputs for first and second operands and having an output, a utility register connected to receive data from said bus and to supply data to said first input of said processor matrix, a scratch pad storage means having a data input, a plurality of storage locations, a data output and means for selectively coupling any desired storage location to said data input and said data output, means to couple said data bus to the data input of said scratch pad storage means, means to couple the output of said scratch pad storage means to said second input of said processor matrix and to said data bus, an intermediate register having an output coupled to said data bus, and means to couple the output of said processor matrix to the input of said intermediate register and to the data input of said scratch pad storage means.

4. A computer system as defined in claim 3 wherein said scratch pad storage means comprises an array of flip-flop registers.

5. A computer system as defined in claim 3 wherein said scratch pad storage means comprises an array of word storage locations arranged in a plurality of sets for a corresponding plurality of program states.

6. A computer system, comprising:

an input data bus, an output data bus, and means to transfer data from said output data bus to said input data bus, a main memory and input-output devices coupled to said input and output data buses, a processor matrix having first and second inputs for first and second operands and having an output, a utility register connected to receive data from said input bus and to supply data to said first input of said processor matrix, a scratch pad storage means having a data input, a plurality of storage locations, a data output and means for selectively coupling any desired storage location to said data input and said data output, means to connect said input data bus to the data input of said scratch pad storage means, means to connect the output of said scratch pad storage means to said second input of said processor matrix and to said output data bus, an intermediate register having an output connected to said output data bus, and means to connect the output of said processor matrix to the input of said intermediate register and to the data input of said scratch pad storage means.

7. A computer system, comprising:

a data bus, a processor matrix having first and second inputs for first and second operands and having an output, a utility register connected to receive data from said bus and to supply data to said first input of said processor matrix, a scratch pad memory having a data output for words read from the memory, a data input for words to be written into the memory and an address input for selecting any desired word location in the memory, a data register connected to receive data from said data bus and to receive data from the data output of said scratch pad memory, means to connect the output of said data register to said second input of said processor matrix, to said data bus and to the data input of said scratch pad memory, an intermediate register having an output connected to said data bus, and means to connect the output of said processor matrix to the input of said intermediate register and to the data input of said scratch pad memory.

8. A computer system, comprising:

an input data bus, an output data bus, and means to transfer data from said output data bus to said input data bus, a processor matrix having first and second inputs for first and second operands and having an output, a utility register connected to receive data from said input bus and to supply data to said first input of said processor matrix, a scratch pad memory having a data output for words read from the memory, a data input for words to be written into the memory and an address input for selecting any desired word location in the memory from which a word is to be read out and into which a word is to be written, a data register connected to receive data from said input data bus and to receive data from the data output of said scratch pad memory, means to connect the output of said data register to said second input of said processor matrix, to said output data bus and to the data input of said scratch pad memory, and means to connect the output of said processor matrix to the data input of said scratch pad memory.

9. A computer system as defined in claim 8, and in addition, an intermediate register having an input connected to the output of said processor matrix and having an output connected to said output data bus.

10. In a computer, a data path structure in which each component is capable of handling, in parallel, a plurality of information bits, of a computer word, comprising:

a data bus, a processor matrix having first and second inputs for first and second operands and having an output, a utility register connected to receive data from said data bus and to supply data to said first input of said processor matrix, a scratch pad storage means having a data output for words read from the storage means, a data input for words to be written into the storage means and an address input for selecting any desired word location in the storage means from which a word is to be read out and for selecting any desired location into which a word is to be written, a data register, converging data paths connected from said data bus and from said scratch pad storage means data output to said data register, branching data paths connected from said data register to said second input of said processor matrix, to said data bus, and to the data input of said scratch pad storage means, an intermediate register having an output connected to said data bus, branching data paths connected from the output of said processor matrix to the input of said intermediate register and to the data input of said scratch pad storage means, and gate means in at least one of said converging and branching data paths to collect or distribute different simultaneously-present portions of a computer word.

11. In a computer, a data path structure in which each component is capable of handling, in parallel, a plurality of information bits of a computer word, comprising:

a data bus, a processor matrix having first and second inputs for first and second operands and having an output, a utility register connected to receive data from said bus and to supply data to said first input of said processor matrix, a scratch pad storage means having a data output, a data input, and an address input for selecting any desired location in the storage means from which a word is to be read out and for selecting any desired location into which a word is to be written, converging data paths connected from said data bus and from the output of said processor matrix to the data input of said scratch pad storage means, branching data paths connected from the output of said scratch pad storage means to said second input of said processor matrix, and to said data bus, an intermediate register having an output connected to said data bus, branching data paths connected from the output of said processor matrix to the input of said intermediate register and, as already recited, to the data input of said scratch pad storage means, and gate means in at least one of said converging and branching data paths to collect or distribute different simultaneously-present portions of a computer word.

12. In a computer, a data path structure in which each component is capable of handling, in parallel, a plurality of information bits of a computer word, comprising:

an input data bus, an output data bus, and means to transfer data from said output data bus to said input data bus, a processor matrix having first and second inputs for first and second operands and having an output, a utility register connected to receive data from said input bus and to supply data to said first input of said processor matrix, a scratch pad memory having a data output for words read from the memory, a data input for words to be written into the memory and an address input for selecting any desired word location in the memory from which a word is to be read out and for selecting any desired location into which a word is to be written, a data register, converging data paths connected from said input data bus and from said scratch pad memory data output to said data register, branching data path connected from said data register to said second input of said processor matrix, to said output data bus, and to the data input of said scratch pad memory, an intermediate register having an output connected to said output data bus, branching data paths connected from the output of said processor matrix to the input of said intermediate register and to the data input of said scratch pad memory, and gate means in at least one of said converging and branching data paths to collect or distribute different simultaneously-present portions of a computer word.

13. A computer system, comprising:

a data bus, a main memory coupled to said data bus, a processor matrix having first and second inputs for first and second operands and having an output, a utility register connected to receive data from said data bus and to supply data to an input of said processor matrix, a scratch pad storage means having a plurality of storage locations and having an address input for selecting any desired storage location in the storage means, means to transfer data from said data bus to any selected one of said scratch pad storage locations, means to transfer data from any selected one of said scratch pad storage locations to an input of said processor matrix and to said data bus, and means to couple the output of said processor matrix directly to any selected storage location in said scratch pad storage means.

14. A computer system, comprising:

a data bus, a main memory coupled to said data bus, a processor matrix having first and second inputs for first and second operands and having an output, a utility register connected to receive data from said bus and to supply data to an input of said processor matrix, a scratch pad storage means having a data output for words read from the storage means, a data input for words to be written into the storage means and an address input for selecting any desired word location in the storage means from which a word is to be read out and into which a word is to be written, a data register connected to receive data from said data bus and to receive data from the data output of said scratch pad storage means, means to connect the output of said data register to an input of said processor matrix, and means to connect the output of said processor matrix to the data input of said scratch pad storage means.

References Cited

UNITED STATES PATENTS

| | | | |
|---|---|---|---|
| 2,843,841 | 7/1958 | King et al. | 340—172.5 X |
| 3,226,694 | 12/1965 | Wise | 340—172.5 |
| 3,234,521 | 2/1966 | Weisbecker | 340—172.5 |
| 3,242,467 | 3/1966 | Lamy | 340—172.5 |
| 3,248,708 | 4/1966 | Haynes | 340—172.5 |
| 3,258,748 | 6/1966 | Schneberger et al. | 340—172.5 |

PAUL J. HENON, *Primary Examiner.*